Jan. 14, 1947.  F. C. MOCK  2,414,322
CHARGE FORMING DEVICE
Filed Jan. 13, 1941
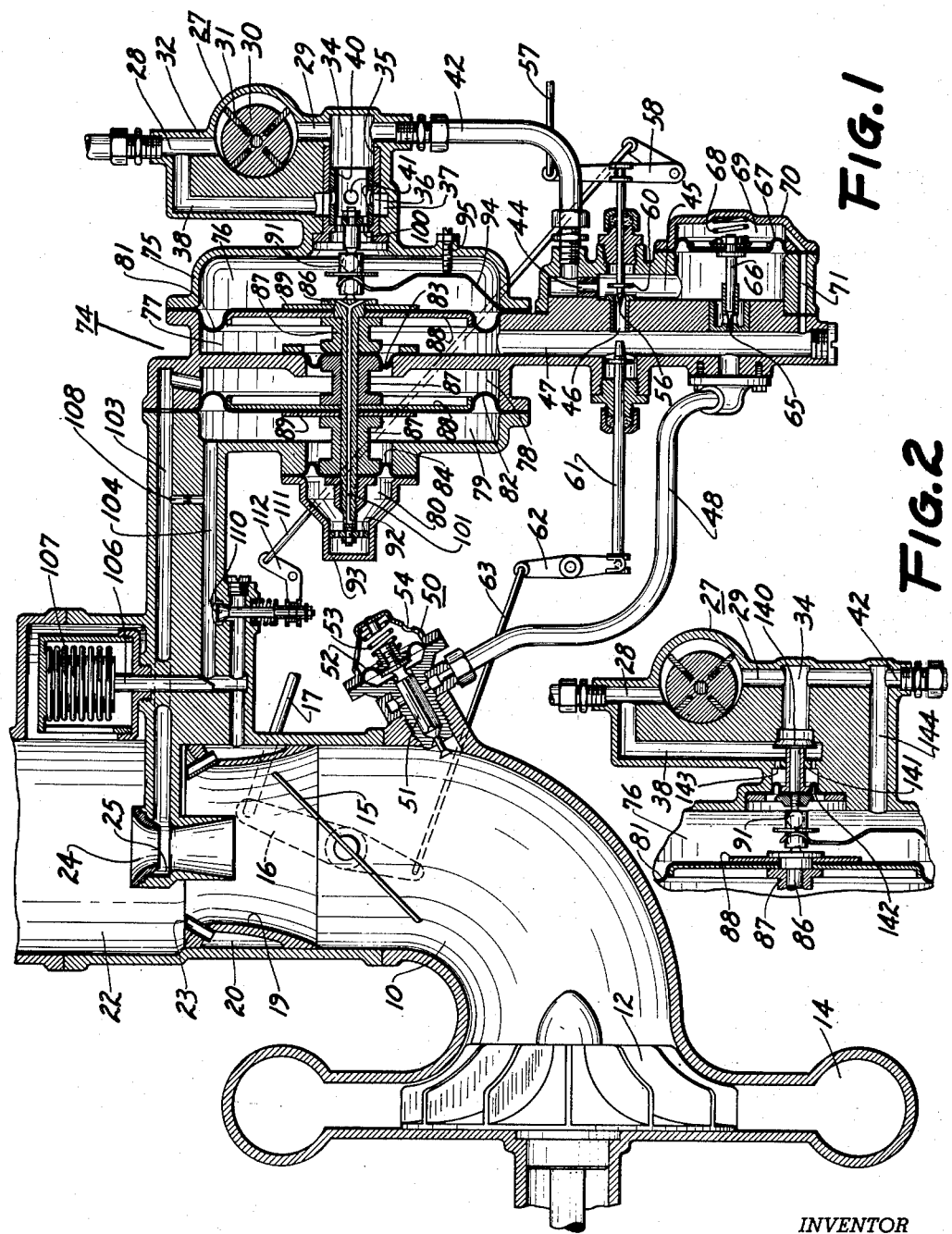
INVENTOR
FRANK C. MOCK
BY
ATTORNEY Patented Jan. 14, 1947

2,414,322

UNITED STATES PATENT OFFICE 2,414,322

CHARGE FORMING DEVICE

Frank C. Mock, South Bend, Ind., assignor to Bendix Aviation Corporation, South Bend, Ind., a corporation of Delaware Application January 13, 1941, Serial No. 374,178

5 Claims. (Cl. 261—36)

This invention relates to charge forming devices for internal combustion engines and more particularly to pressure-feed devices of the type shown in my copending application Serial No. 202,206, filed April 15, 1938, now Patent No. 2,390,658 dated Dec. 11, 1945.

It is an object of the invention to regulate the fuel supplied to an engine by controlling the effective output of the fuel pump.

Another object of the invention is to regulate the fuel supplied to an engine by controlling a bypass passage around the fuel pump.

It is a further object to provide an improved control for the fuel pump bypass valve whereby the fuel supplied to the engine by the pump will be controlled within narrow limits.

Another object of the invention is to provide a charge forming device closely associated with the fuel pump whereby a compact device utilizing fewer parts is obtained.

Another object of the invention is to supply fuel under positive pressure, the fuel supply being regulated to maintain a proper fuel-to-air ratio. This arrangement causes the fuel to be atomized under pressure to produce a better mixture and keeps the fuel under atmospheric or superatmospheric pressure at all times thereby eliminating boiling of the fuel and insuring accurate metering.

Another object of the invention is to eliminate the formation of ice in the fuel mixing device; a function which is particularly important in the case of aircraft flying at high altitudes. This is accomplished by injecting the fuel into a warm or hot part of the manifold system posterior to the throttle.

Another object of the invention is to provide a fuel feeding device which will operate properly in any position so that when installed on aircraft the engine will be properly supplied with fuel regardless of the position of flight. This is highly important during maneuvers of different kinds, particularly those experienced with military aircraft, at which time an adequate fuel supply is indispensable.

This fuel supply apparatus, while especially applicable to fuel supply regulating systems hereinafter particularly described, is not limited to such uses but is obviously available, with or without modification, in a great variety of cases where fuel is to be supplied under more or less analogous conditions.

Other desirable characteristics and advantages of the present invention will be readily apparent to one skilled in the art from the following description in connection with the appended drawing and I contemplate the employment of any structures, arrangements, or modes of operation that are properly within the scope of the subjoined claims.

Figure 1 is a diagrammatic sectional view of a device embodying the invention; and Figure 2 is a partial sectional view illustrating a modified arrangement of the fuel control valve.

With reference to Figure 1, a main air conduit 10 leads to a rotary blower or supercharger 12 of an internal combustion engine of any desired type. The supercharger discharges into a generally annular chamber 14 from which pipes lead to the intake ports of the various cylinders. The blower 12 is not essential to the invention but is here shown as representing approved practice in aircraft engines.

The conduit 10 is controlled by a throttle 15 which is operated through a lever 16 by a rod 17 extending from the pilot's cockpit. The pilot thus controls directly the air charge of the engine while the fuel charge is automatically controlled by the apparatus hereinafter described. A large venturi 19, of any desired contour, is positioned in the conduit 10 anterior to the throttle and is formed with an annular chamber 20 which communicates with the air inlet 22 through a plurality of tubes 23 so as to be subjected to the pressure of the incoming air. The tubes 23 project out a substantial distance so that any rain or the like washing along the walls of the air conduit will not enter the chamber 20. A primary venturi 24 is positioned within the venturi 20 in a conventional manner and is formed with an annular chamber 25 opening substantially into the throat of the venturi to be subjected to the pressure therein.

In some cases a supercharger may be employed, either in place of or in addition to the supercharger 12, to supply air at superatmospheric pressure to the entrance 22 of passage 10. In other cases the entrance 22 is merely flared and opens in the direction of travel of the craft so that the inertia of the entering air will build up a pressure above atmospheric at the entrance. The entrance in such cases is generally referred to as an air scoop.

A fuel pump 27, arranged to be driven either by the engine or by an auxiliary source of power, receives fuel from a source through an inlet 28 and discharges it through an outlet 29. Any type of fuel pump capable of delivering fuel at the maximum necessary rate and pressure may be used, the one shown being of the sliding vane type comprising a rotor 30 slidably carrying a set of vanes 31 and rotatably mounted in a casing 32. A valve chamber 34 in the casing 32 is in direct communication with the discharge outlet 29 and is provided with a valve sleeve 35 having a plurality of apertures 36 communicating with an annular chamber 37 which is connected through a passage 38 to the pump inlet 28. A slide valve 40 is slidably received in the sleeve and contains a plurality of apertures 41 cooperating with the apertures 36. Axial movement of the valve 40 thus variably controls a bypass around the fuel pump whereby a portion of the fuel discharged by the pump is bypassed to the pump inlet and the remainder is delivered to a pipe 42. Axial positioning of the valve 40 and the resulting control of the fuel delivered to pipe 42 is accomplished by a control unit hereinafter described.

Fuel received by the pipe 42 flows through a fixed metering orifice 44 into a fuel chamber 45, thence through an adjustable orifice 46 into a fuel passage 47, and through a pipe 48 to a discharge nozzle indicated generally at 50 which discharges in the passage 10 posterior to the throttle. The nozzle 50 is provided with a valve 51 opening away from the manifold and connected to a flexible diaphragm 52. The pressure of the fuel entering the nozzle through pipe 48 acts on one face of the diaphragm 52 tending to open the valve and is opposed by a spring 53. The discharge nozzle 50 may be of any other desired type such, for example, as any of the novel modifications disclosed in the copending application of Mock and Partington, Serial No. 243,067, filed November 30, 1938, now Patent 2,310,984, dated February 16, 1943, or in my copending application Serial No. 350,517, filed August 3, 1940, now Patent 2,372,332, issued March 27, 1945. The other face of the diaphragm may be subjected to atmospheric pressure through the port 54 or to a source of variable pressure such, for example, as Venturi depression, as is disclosed in the above copending joint application.

The orifice 46 is varied in effective area by means of a tapered valve or needle 56 adapted to be moved into a more or less restricting position by the pilot through link 57 and pivoted lever 58. The pilot is thus able to control the effective area of the orifice 46 between predetermined limits and consequently the richness of the mixture. A disk 60 on valve 56 is adapted to close orifice 46 upon extreme movement to the left of link 57 to shut off the fuel supply to the nozzle 50 when the engine is to be stopped. A second tapered valve 61 operated through levers 62 and 16 and link 63 is arranged to restrict the passage 46 when the throttle approaches closed position for reasons to be explained hereinafter. Although the valves 56 and 61 are shown as cooperating with the same orifice 46, it will be apparent that they may be positioned at different points in the fuel conduit, the primary requirement being that each restricts the effective area for fuel flow between the chamber 34 and the fuel passage 47.

A power enrichment orifice 65 forms a bypass around the adjustable orifice 46 and is controlled by a valve 66 connected to a diaphragm 67 and urged toward closed position by spring 68. A chamber 69 formed by the diaphragm 67 and a cap 70 communicates through passage 71 with the fuel conduit 47. The diaphragm 67 is thus subjected to the pressures in chamber 45 and conduit 47 and is arranged to open the valve 66 when the differential of these pressures exceeds a predetermined value.

The valve 40 is axially positioned by a control unit, of a type similar to the one disclosed in my copending application Serial No. 202,206, filed April 15, 1938, indicated generally at 74. The end section 75 of the control unit may be formed integrally with the pump casing 32 or in a manner for attachment thereto. The control unit is divided into five chambers 76, 77, 78, 79 and 80 by two large actuating diaphragms 81 and 82 and two small sealing diaphragms 83 and 84. The diaphragms are secured at their outer edges to the casing of the control unit 74 and at their centers to a control rod 86 by means of hubs 87, cups 88 and disks 89. The diaphragms preferably contain annular grooves preformed therein that closely encircle the hubs and cups and lie adjacent the confining walls of the casing, whereby their effective areas will remain substantially unchanged with longitudinal movement of the control rod.

The rod 86 is connected at one end to the valve 40 through a double universal connection 91 to eliminate any binding action resulting from possible misalinement of the various parts. An apertured disk 92 is connected to the left end of the control rod and is slidably received in a cylinder formed in the end cap 93 of the control unit. The disk 92 serves both as a bearing or support for the control rod and also as a dashpot for damping longitudinal vibrations of the control rod assembly. A light leaf spring 94 engages the control rod and yieldingly urges the rod and valve 40 to the right toward closed position to provide an idle enrichment as will be explained more fully hereinafter. An adjustment screw 95 is provided to vary the idle spring setting.

The chamber 76 communicates with the fuel pump discharge passage through apertures 100 in the valve 40 and with the chamber 80 through a passage 101 in the control rod 86. Chambers 76 and 80 are thus subjected to the fuel pump discharge pressure. This pressure is also present at the entrance to the fixed metering orifice 44 and will therefore be referred to as unmetered fuel pressure. The chamber 77 is in communication with the fuel passage 47 and is subjected to the pressure of the fuel posterior to the orifice 46, to be refered to as metered fuel pressure. Chambers 76, 77 and 80 are preferably provided with air bleed cocks (not shown) to permit complete filling of the chambers with fuel when the device is installed on an engine.

The chamber 78 communicates through a passage 103 with the annular chamber 25 of the primary venturi 24 and is subjected to the pressure at the venturi. The chamber 79 is connected through a passage 104 to the annular chamber 20 of the venturi 19 and is thus subjected to air inlet pressure, unless modified as hereinafter described. The passage 104 is controlled by a valve 106 connected to an aneroid or capsule shown in Figure 1 as a sealed corrugated bellows 107 positioned in the air inlet and adapted to contract and expand with variations in the pressure and/or temperature of the entering air to thereby open passage 104 at high air densities, as at sea level, and to close the same at low air densities, as at high altitude. A calibrated passage 108 interconnects the passages 103 and 104. Passage 108 is sufficiently small in comparison with passages 103 and 104 that when valve 106 is open, air flow through passage 108 is not effective in materially altering the pressures existing in chambers 78 and 79. As altitude is gained and the valve 106 moves toward closed position, the flow of air from passage 104 to passage 103 through passage 108 in response to Venturi suction becomes increasingly effective in reducing the pressure within the chamber 79.

A normally closed spring loaded valve 110 controls a bypass around the valve 106. An overrunning connection comprising the link 111 and bell crank 112 is provided between the lever 58 and the valve 110 whereby the valve 56 may be operated as previously described without affecting the valve 110. However, if the link 57 is pulled to the extreme right the valve 110 will be opened to admit air at intake pressure to the passage 104 and chamber 79 regardless of the position of the bellows controlled valve 106. Thus in case of an emergency the restricting effect of valve 106 may be eliminated.

During periods of operation at sea level the chamber 79 is subjected to entering air pressure, chamber 78 to Venturi pressure, chamber 77 to the fuel pressure posterior to the metering orifice (or metered fuel pressure) and chambers 76 and 80 to the fuel pressure anterior to the metering orifices (or unmetered fuel pressure). Air flow through the passage 10 creates a differential between the pressures at the air entrance and at the venturi which is proportional to the square root of the rate of air flow through the passage 10, provided the entering air density remains constant. These pressures acting respectively in chambers 79 and 78 create a net force to the right on control rod 86 which is likewise proportional to the square root of the rate of air flow.

Fuel flow through the orifice 44 and orifice 46 creates a differential between the unmetered and metered fuel pressures which is proportional to the square root of the rate of fuel flow. These pressures acting in chambers 76 and 80 and in chamber 77 create a net force to the left on the control rod 86 which is likewise proportional to the square root of the rate of fuel flow.

The control rod 86 and valve 40 float under the action of these forces, the air force tending to close valve 40 and increase the fuel flow through conduit 42 and the fuel force tending to open valve 40 and decrease the fuel flow through conduit 42. Obviously the valve will seek an equilibrium position at which the fuel force balances the air force, unless modified by some extraneous force, such as idle spring 94. Since the air force is proportional to the square root of the air flow and the fuel force is proportional to the square root of the fuel flow the fuel and air are maintained in constant proportion. Thus, if the air flow increases the Venturi-to-air-scoop differential will increase and the increased air force on the rod 86 will move the valve 40 to the right toward closed position. Closing movement of valve 40 decreases the quantity of fuel bypassed and increases the rate of fuel flow to the engine through passage 42 until the fuel differential and resulting fuel force on the control rod 86 again balances the air force. A constant fuel-to-air ratio is thus maintained. Likewise, if for some reason the fuel pump discharge pressure suddenly increased the fuel flow through conduit 42 would also tend to increase. However, the resulting increase in the unmetered to metered fuel differential would urge the valve 40 toward open position until the fuel metering differential was again established at its previous value.

It is to be noted that the control unit 74 regulates the fuel flow so as to maintain the differential between the unmetered and metered fuel pressures equal or proportional to the differential in the air pressures in chambers 78 and 79. Thus, if the pilot moves valve 56 into a more restricting position in orifice 46, the unmetered-to-metered fuel differential remains as before but since the metering orifice area has been reduced the fuel flow will be correspondingly reduced, thereby leaning the mixture.

The idle spring 94 exerts a moderately small force on the rod 86 in the same direction as the air force. At idle the air force is also small and the combined air and spring forces result in an appreciable percentage increase in fuel flow, thereby providing a rich mixture at idle as is desired. As the air flow increases with increase in throttle opening the spring force becomes of decreasing relative importance, thereby providing less and less enrichment as the air flow increases, and becoming of negligible effect at moderately high air flows. The spring thus merely applies an extraneous force to upset the balance or proportion otherwise maintained between the air and fuel forces. Any other means for applying an extraneous force to the control rod could obviously be used to vary the richness of the mixture. It has been found generally desirable to utilize the spring 94 to obtain a somewhat richer idle characteristic than is desired and then to use a throttle operated valve 61 to variably restrict the fuel passage 46 when the throttle approaches closed position to produce the desired mixture richness. By varying the taper of valve 61 any desired idle and near idle richness characteristic may be obtained.

As the power output of the engine increases the fuel flow and consequently the fuel metering differential pressure correspondingly increase. When the differential between the unmetered and metered fuel pressures reaches or exceeds a predetermined value, these pressures acting on diaphragm 67 compress spring 68 and open the valve 66 to thereby increase the available fuel metering area and consequently enrich the mixture as is desired under conditions of high power output.

Some operators desire to be able to regulate the richness of the mixture during emergency operation when the valve 66 is open, while others prefer that the richness of the mixture at this time shall be automatically regulated at the optimum value for high power operation independently of the control of the pilot. Either of these conditions can be obtained as desired by exclusion or inclusion of the orifice 44. If, for example, the orifice 65 is considerably larger than orifice 44, orifice 44 will function as the sole or primary restriction to fuel flow when orifice 65 is open as at full power, and operation of valve 56 will have substantially no effect on the fuel flow. On the other hand, if the orifice 44 is omitted or is made larger than the combined areas of the orifice 46 and orifice 65, operation of valve 56 will vary the richness of the mixture during both normal and emergency operation. By properly proportioning the size of orifices 44, 46 and 65 and valve 56, the pilot may be provided with any desired range of richness control during normal operation as well as the same or any lesser range of control during emergency or high power operation.

As is generally known, a constant weight of air flow will produce a greater Venturi-to-air-scoop depression at low air density than at high air density. This characteristic, unless compensated for, would result in an increase in mixture richness with increase in altitude. However, as the altitude increases the decreased entering air density causes bellows 107 to expand, moving valve 106 into a position partially restricting the passage 104. Air flow through the passage 108 in response to Venturi suction becomes effective to reduce the pressure in chamber 79, thereby reducing the differential which would otherwise exist across the diaphragm 82. The valve 106, bellows 107 and passage 108 are calibrated to maintain the differential pressure across diaphragm 82 at a substantially constant value for a constant weight of air flow regardless of the entering air density. A constant air-fuel ratio is thus obtained regardless of variations in entering air density. It is readily apparent, however, that by over-compensating or under-compensating for entering air pressures and/or temperatures, a leaner or richer mixture may be produced as desired with change in the entering air pressures or temperatures.

If while operating at high altitudes the valve 106 became stuck in a restricting position, the mixture would become excessively lean upon a subsequent reduction in altitude, and damage to the engine might result. The bypass valve 110 is provided to eliminate this possibility and may be opened at will by the pilot to bypass air around the restriction created by valve 106.

In Figure 1, the valve 40 is of the balanced slide valve type in which there is no unbalanced force created on the valve either by the pressure in chamber 34 or the pressure in passage 38. The valve 40 is thus under the control of the control unit 74 and is not affected by variations in the pressure differential across the valve.

Figure 2 discloses a modified fuel control valve arrangement in which a diaphragm balanced poppet type valve controls the fuel pump bypass. With particular reference to Figure 2, a poppet-type valve 140 controls the communication between the chamber 34 and passage 38 and is guided by a bearing 141. The valve 140 is connected to the control rod through a double universal connection 91 as before. A diaphragm 142 of substantially the same mean effective area as valve 140 is connected to the valve and casing to eliminate the unbalance resulting from the differential pressure across the poppet valve. Apertures 143 provide an unrestricted communication between passage 38 and the one side of diaphragm 142. A passage 144 provides an unrestricted communication between the chamber 76 and the discharge passage of the fuel pump.

Fuel discharge pressure acting to the left on the valve 140 is thus balanced by an equal pressure in chamber 76 acting to the right on diaphragm 142. Likewise the pressure in passage 38 acts to the right on valve 140 and to the left on the diaphragm 142 and is thus also balanced. The valve 140 is therefore controlled by the unit 74 and is unaffected by variations in the pressure differential across the valve.

It will also be understood that many changes might be made in form and arrangement of parts and it is not intended that the scope of the invention shall be limited to the forms shown and described nor otherwise than by the terms of the appended claims.

I claim:

1. A charge forming device for an internal combustion engine comprising a throttle controlled air passage for supplying air to the engine, a venturi in said passage anterior to the throttle, a fuel pump having a fuel discharge conduit leading to said passage posterior to the throttle, area restricting means in said fuel conduit, a bypass around the fuel pump, a valve in said bypass, a plurality of parallel flexible diaphragms operatively connected together and to said valve for operating the same in response to variations in the pressures to which the diaphragms are subjected, and means for subjecting the surfaces of said diaphragms to pressures derived from the venturi, the air passage anterior to the throttle and the fuel conduit anterior and posterior to the area restricting means, the pressures from the venturi and the fuel conduit anterior to the area restricting means urging the diaphragms in a valve opening direction and the pressures from the air passage and the fuel conduit posterior to the area restricting means urging the diaphragms in a valve closing direction.

2. A charge forming device for an internal combustion engine, comprising a throttle controlled air passage for supplying air to the engine, a venturi in said passage anterior to the throttle, a fuel pump, a fuel conduit connecting the pump and passage, area restricting means in said conduit, a fuel duct leading from the conduit anterior to the area restricting means to the inlet side of the fuel pump, a valve in said duct, a plurality of diaphragms having annular grooves preformed therein operatively connected to each other and to said valve for operating the valve in response to variations in the pressures to which the surfaces of the diaphragms are subjected, and pressure transmitting passages connecting the surfaces of said diaphragms with the venturi, the air passage anterior to the throttle and the fuel conduit anterior and posterior to said area restricting means, said diaphragms being arranged in such a manner that the differential in the air passage and Venturi pressures urges the diaphragms in a valve closing direction and the differential in the fuel pressures anterior and posterior to said area restricting means urges the diaphragms in a valve opening direction.

3. The invention defined in claim 2 comprising in addition means including a sealed capsule responsive to variations in pressure resulting from variations in altitude for modifying at least one of the pressures applied to the surfaces of the diaphragms.

4. A charge forming device for an internal combustion engine comprising a throttle-controlled air passage for supplying air to the engine, a venturi in said passage anterior to the throttle, a fuel pump having a fuel discharge conduit supplying fuel to the engine, area restricting means in said fuel conduit, a by-pass around the fuel pump, a lift-type valve located in said by-pass, a plurality of substantially parallel diaphragms operatively connected together and to said valve for operating the same in response to variations in the pressures to which the diaphragms are subjected, and means for subjecting the surfaces of said diaphragms to pressures derived from the venturi, the air passage anterior to the throttle and the fuel conduit anterior and posterior to the area restricting means; the pressures from the venturi and the fuel conduit anterior to the area restricting means urging the diaphragms in a valve-opening direction and the pressures from the air passage and the fuel conduit posterior to the area restricting means urging the diaphragms in a valve-closing direction.

5. A charge forming device for an internal combustion engine comprising a throttle-controlled air passage for supplying air to the engine, a venturi in said passage anterior to the throttle, a fuel pump having a fuel discharge conduit supplying fuel to the engine, area restricting means in said fuel conduit, a by-pass around the fuel pump, a valve in said by-pass of the unbalanced type, a diaphragm connected to said valve and subjected to the differential in pressures across said valve for balancing the valve, a plurality of substantially parallel diaphragms operatively connected to said valve for operating the same in response to variations in the pressures to which the diaphragms are subjected, and means for subjecting the surfaces of said diaphragms to pressures derived from the venturi, the air passage anterior to the throttle and the fuel conduit anterior and posterior to the area restricting means; the pressures from the venturi and fuel conduit anterior to the area restricting means urging the diaphragms in a valve opening direction and the pressure from the air passage and the fuel conduit posterior to the area restricting means urging the diaphragms in a valve-closing direction.

FRANK C. MOCK.